United States Patent [19]
Perez et al.

[11] Patent Number: 5,516,687
[45] Date of Patent: May 14, 1996

[54] DEVICE AND METHOD FOR MAINTAINING BACTERIAL LEVELS WITHIN AN ORGANIC WASTE COLLECTION CONTAINER

[75] Inventors: J. Peter Perez; John A. Christiansen, both of Baton Rouge, La.

[73] Assignee: Interbio, Inc., Baton Rouge, La.

[21] Appl. No.: 225,007

[22] Filed: Apr. 8, 1994

[51] Int. Cl.⁶ .......................... C12M 1/14; C12M 1/18; C02F 3/00; B01D 17/00

[52] U.S. Cl. .................. 435/262; 435/289.1; 435/303.1; 210/617; 210/610; 210/608; 210/538; 210/532.2

[58] Field of Search ...................... 435/262, 299, 435/300, 310; 210/615–617, 601, 610, 198.1, 608, 538, 532.2

[56] References Cited

U.S. PATENT DOCUMENTS

| | | | |
|---|---|---|---|
| 4,670,149 | 6/1987 | Francis | 210/608 |
| 4,810,385 | 3/1989 | Hater et al. | 210/606 |
| 4,925,564 | 5/1990 | Francis | 210/608 |
| 4,990,449 | 2/1991 | Caissel | 210/617 |
| 5,171,687 | 12/1992 | Mollen et al. | 210/610 |
| 5,225,083 | 7/1993 | Pappos et al. | 210/610 |

FOREIGN PATENT DOCUMENTS 5293 1/1993 Japan.

Primary Examiner—William H. Beisner
Assistant Examiner—T. J. Reardon
Attorney, Agent, or Firm—Roy, Kiesel & Tucker

[57] ABSTRACT

A device and method for maintaining effective bacterial levels within a collecting container of an organic matter collection system of the type having a collecting container having a bottom and a liquid to air interface-surface is provided. The bacterial incubator comprise: a housing having a first and second interior chamber; an elongated feed tube, connected to the housing, having a passageway terminating at one end in connection with the second interior chamber and terminating at the other end in a feed opening; and a plurality of high surface-area members that are contained within the first interior chamber. The first interior chamber is in fluid connection with both the second interior chamber and the exterior of the housing. The elongated feed tube is of a length sufficient to allow a section thereof containing the feed opening to be positioned above the air to liquid interface-surface of a collecting container. The method comprises the steps of providing a bacterial incubator of the type previously described; positioning the housing beneath interface-surface in a manner such that the housing is supported by the container bottom and a section of the elongated feed tube containing the feed opening extends above the interface-surface; and periodically adding bacterial cultures to the second interior chamber through the feed passageway via the feed opening.

21 Claims, 10 Drawing Sheets

DEVICE AND METHOD FOR MAINTAINING BACTERIAL LEVELS WITHIN AN ORGANIC WASTE COLLECTION CONTAINER

BACKGROUND OF THE INVENTION

1. Field of the Invention

This invention relates generally to methods and devices used for degrading organic waste and, more specifically to a method and device for maintaining an effective bacterial level within the collecting chamber of an organic matter collection system.

2. Prior Art

The disposal of the grease and oil generated during the operation of a facility such as a restaurant is becoming increasingly difficult because of the imposition of stringent municipal waste disposal regulations. In the past, a common solution to the disposal problem was to simply pour the waste oils and liquified grease into a drain connected to the waste water disposal system. This solution was not without its drawbacks. The grease and oils accumulated within the pipes causing blockages in the lines and sewer backups within the establishment. To minimize these new problems, organic matter collection systems, often referred to as grease traps, are installed within the flow path of the waste water disposal system. These collection systems have a collecting container that provides favorable conditions for the accumulation of the greases and oils in a specific location. The collecting container is generally accessible to maintenance personnel to allow for removal of the accumulation of grease and oil. Thus, the original problem of disposal has returned.

One solution to the disposal of grease, oil and other organic matter collected within the collecting container of an organic matter collection system is to inoculate the liquid within the collecting container with bacterial cultures containing grease and oil degrading bacteria. The bacteria degrade the greases and oils into compounds which will not cause blockages within the wastewater disposal system and which may be disposed into the wastewater disposal system under the disposal regulations.

Various devices and methods have been designed in an attempt to effectively implement this solution. One method is to prepare and pour a solution containing bacterial cultures into the waste water disposal system via the drains within the establishment. However, because the bacteria containing solution must typically be prepared about an hour in advance and may, therefore, be forgotten or overlooked in the course of a busy day; and because, once poured into the wastewater disposal system, the great majority of bacteria may flow through and past the collecting container and, therefore, requires the use of a large quantity of bacterial cultures; this solution can make maintaining an effective bacterial level within the collecting container both time consuming and expensive to implement.

U.S. Pat. Nos. 4,925,564, 4,810,385 and 4,670,149 disclose other attempts to provide workable devices and methods for maintaining the bacterial level within the collecting container of an organic matter collection system. U.S. Pat. Nos. 4,925,564 and 4,670,149, invented by John Francis, issued on May 15, 1990, and Jun. 2, 1987, respectively, describe methods which include positioning, within the collecting container, a bacterial incubator adapted to float at the air to liquid interface. Bacteria cultures are then added to the wastewater system by preparing and pouring a solution containing the bacteria cultures into the drains within the establishment. Because the solution containing the bacteria cultures must be prepared in advance and the solution is added to the aqueous medium, this method is subject to the same flow-through and preparation time problems previously discussed.

U.S. Pat. No. 4,810,385, invented by Gary Hater, Mark Krupka and Lois Davis, issued on Mar. 7, 1989, describes a porous fabric sock-like member filled with dried bacterial cultures. The sock is placed directly in the path of the waste stream flow. As the waste stream flows through the sock-like member the dried bacterial cultures or microorganisms are wetted and released into the stream. Because the majority of bacterial cultures or micro-organisms are released during periods of high wastewater flow, using this type of device can result in an expensive loss of bacterial cultures from the collecting container. In addition, replacing spent sock-like members can be objectionable because the sock-like member is usually saturated with sewage.

It would, therefore, be desirable to have a device and method for maintaining the bacterial level within the collecting container of an organic matter collection system that will maintain effective bacterial levels within the collecting container, that is inexpensive to implement, that does not require prior preparation, that is not objectionable to the person practicing the method and that requires only minimal training to use and practice.

SUMMARY OF THE INVENTION

It is, therefore, an object of this invention to provide a device for inexpensively maintaining effective bacterial levels within the collecting container of an organic matter collection system.

It is another object of this invention to provide a device for maintaining effective bacterial levels within the collecting container of an organic matter collection system which is not objectionable to use.

It is another object of this invention to provide a device for maintaining effective bacterial levels within the collecting container of an organic matter collection system which requires minimal training to use.

It is another object of this invention to provide a device for maintaining effective bacterial levels within the collecting container of an organic matter collection system which requires minimal preparation time to use.

It is still another object of this invention to provide a device for maintaining effective bacterial levels within the collecting container of an organic matter collection system which accomplishes some or all of the above objectives.

It is a further object of this invention to provide a method of maintaining effective bacterial levels within the collecting container of an organic matter collection system which accomplishes some or all of the above objectives.

Accordingly, a bacterial incubator for use in an organic matter collection system of the type having a collecting container having a bottom and a liquid to air interface-surface is described. The bacterial incubator comprises: a housing, an elongated feed tube in connection with the interior of the housing and a plurality of high surface area members positioned with the interior of the housing.

The housing has an exterior surface, a first interior chamber and a second interior chamber. The first and second interior chambers are separated by a common wall. The first interior chamber is partially defined by a first wall having a plurality of first apertures therethrough that connect the first interior chamber with the exterior surface of the housing. The common wall separating the first and second interior chambers has a plurality of second apertures therethrough which connect the second interior chamber with the first interior chamber.

The elongated feed tube has a passageway therethrough that terminates in a first and second passageway opening. The first passageway opening is in connection with the second interior chamber. The elongated feed tube is of a length sufficient to allow a section thereof containing the second passageway opening to extend above the liquid to air interface-surface of the organic matter collecting system when the housing is positioned at the bottom of the organic matter collecting system.

The plurality of high surface area members are contained within the first interior chamber. The high surface area members have exterior dimensions sufficient to prevent the high surface area members from passing through the first and second apertures.

The bacterial incubator is constructed of materials which give the bacterial incubator a mass to volume ratio which is sufficient to cause the housing containing the plurality of high surface area members to sink to the bottom of the organic matter collecting container and remain there unanchored when in use.

In a preferred embodiment, the bacterial incubator further includes a weight means, connected to the housing at a location near a bottom portion of the housing, for lowering the center of gravity of the housing containing the plurality of high surface area members.

In another preferred embodiment, the bacterial incubator first described further includes a cap means detachably securable to the elongated feed tube in a manner such that the second passageway opening is sealed.

In another preferred embodiment, the shape of the first interior chamber is tubular and the shape of the second interior chamber is cylindrical.

In another preferred embodiment, the elongated feed tube passes through the exterior surface directly into the second interior chamber.

In another preferred embodiment, the elongated feed tube has sufficient rigidity to allow the section of the elongated feed tube containing the second passageway opening to remain above the air to liquid interface-surface supported only by the housing.

In another preferred embodiment, the total void area of the plurality of second apertures is less than the total void area of the plurality of first apertures.

A method of maintaining effective bacterial levels within a collecting container of an organic matter collection system of the type having a collecting container having a bottom and a liquid to air interface-surface is, also, provided. The method comprises the steps of:

a) providing a bacterial incubator comprising:
  i) a housing having an exterior surface, a first interior chamber and a second interior chamber, the first and second interior chambers being separated by a common wall, the first interior chamber being partially defined by a first wall having a plurality of first apertures therethrough connecting the first interior chamber with the exterior surface of the housing, the common wall separating the first and second interior chambers having a plurality of second apertures therethrough connecting the second interior chamber with the first interior chamber;
  ii) an elongated feed tube having a passageway therethrough that terminates in a first and second passageway opening, the first passageway opening being in connection with the second interior chamber, the elongated feed tube being of a length sufficient to allow a section thereof containing the second passageway opening to extend above the liquid to air interface-surface of the organic matter collecting system; and
  ii) a plurality of high surface area members contained within the first interior chamber, the high surface area members having exterior dimensions sufficient to prevent the high surface area members from passing through the first and second apertures;

b) positioning the housing beneath the interface-surface of the collecting container in a manner such that the housing is supported by the container bottom and a section of the elongated feed tube containing the second passageway opening extends above the liquid to air interface-surface; and c) periodically adding bacterial cultures to the second interior chamber through the passageway of the elongated feed tube via the second passageway opening.

In another preferred method the bacterial cultures are contained within a water-soluble container having external dimensions which allow the water-soluble container to slide through the passageway into the second internal chamber.

In another preferred method the bacterial incubator further includes a weight means, connected to the housing at a location near a bottom portion of the housing, for lowering the center of gravity of the housing containing the plurality of high surface area members.

In another preferred method the bacterial incubator further includes a cap means, detachably securable to the elongated feed tube in a manner such that the second passageway opening is sealed, for preventing the escape of gases through the second passageway opening.

In another preferred method the elongated feed tube has sufficient rigidity to allow the section of the elongated feed tube containing the second passageway opening to remain above the air to liquid interface-surface supported only by the housing.

In another preferred method, the method further includes the steps of providing a cover for the collecting container having a cover aperture of sufficient dimensions to allow a section of the elongated feed tube containing the second passageway opening to pass through the cover; and positioning the cover over the collecting container in a manner such that a section of the elongated feed tube containing the second passageway opening passes through the cover.

DETAILED DESCRIPTION OF PREFERRED EMBODIMENTS OF THE INVENTION

For purposes of this application, the term "organic matter collection system" shall mean any waste water treatment device having an area for trapping and retaining trapped organic matter from a liquid waste stream. The term "collecting container" shall mean the area of the organic matter collection system wherein the trapped organic matter is retained. In addition, the term "effective bacterial levels" shall mean at least that level of bacterial concentration which will prevent an accumulation of oil and or grease in the collecting container which will form a cap over the air to liquid interface-surface. It should also be understood that the bacterial incubator and method of maintaining effective bacterial levels within the collecting container of an organic matter collecting system described herein will also function in applications wherein organic matter is stored in a liquid form in a container having an air to liquid interface-surface.

The bacterial incubator of the present invention generally comprises: a housing having a first interior chamber for containing a plurality of high surface-area members, a second interior chamber for receiving bacterial cultures; an elongated feed tube, connected to the housing and having a passageway, terminating at one end in connection with the second interior chamber and terminating at the other end in a feed opening; and a plurality of high surface-area members, contained within the first interior chamber, for providing a multiple increase in the surface area upon which the bacteria may become attached and multiply. The first interior chamber is in fluid connection with both the second interior chamber and the exterior of the housing. The elongated feed tube is of a length sufficient to allow a section thereof containing the feed opening to be positioned above the air to liquid interface-surface of a collecting container. The elongated feed tube allows the addition of bacterial cultures to the second interior chamber without removing the housing from the collecting container.

Figure 1:
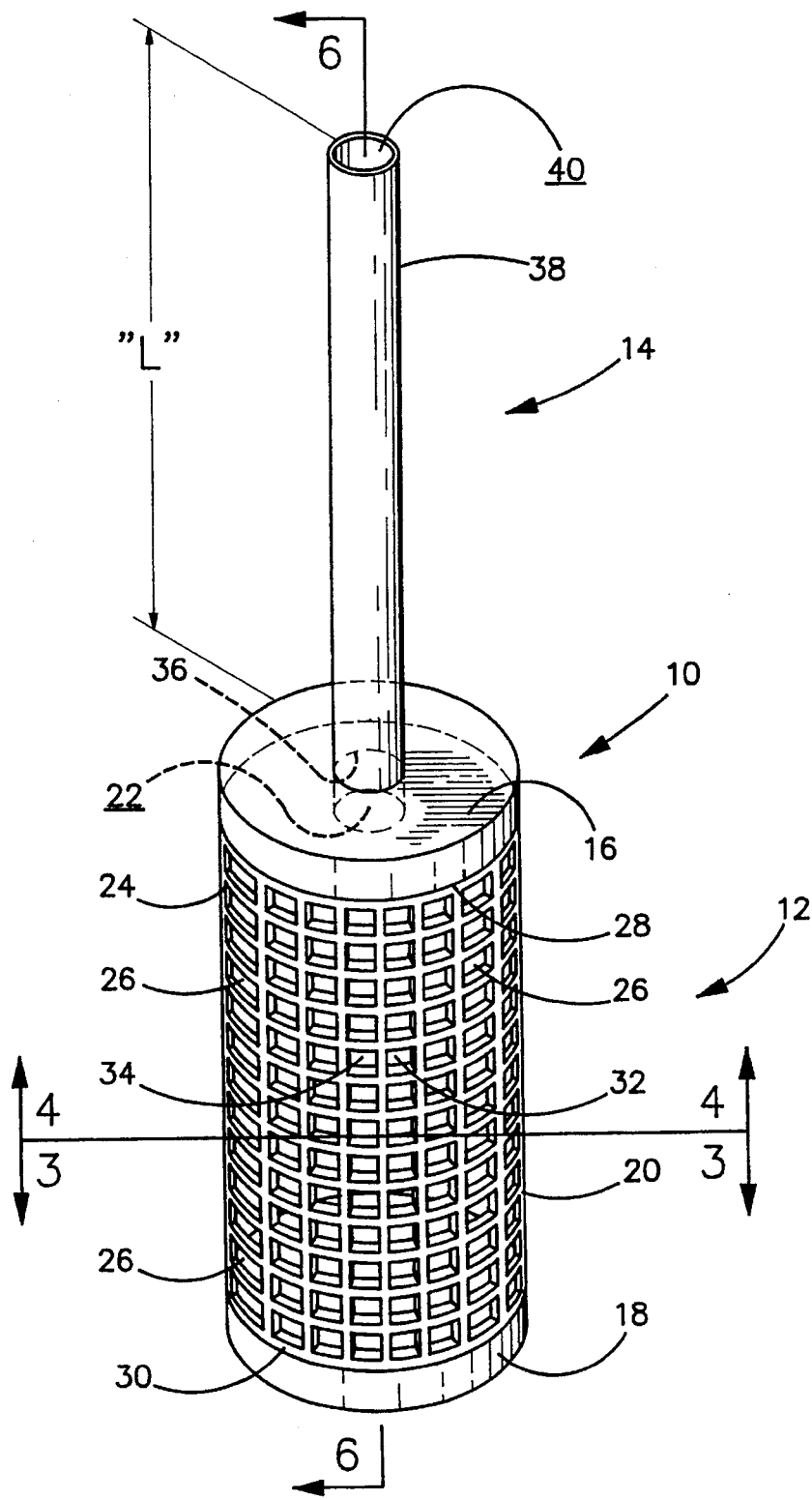
FIG. 1 is a perspective view of an embodiment of the bacterial incubator of the invention.

FIG. 1 is a perspective view of a preferred embodiment of the bacterial incubator, generally indicated by the numeral 10, and shows the housing, generally indicated by the number 12 and the elongated feed tube, generally indicated by the numeral 14.

As shown in FIG. 1, housing 12 includes a top plate 16, a bottom plate 18 and an exterior wall 20. Top plate 16 is disk shaped and has an access aperture 22 formed through the center to allow access into the interior of housing 12. Bottom plate 18 is also disk shaped and has about the same circumference as top plate 16. In this preferred embodiment both top plate 16 and bottom plate 18 are constructed from about 2 centimeter thick disk shaped section of polyvinylchloride, however other shapes, thicknesses and construction materials may be utilized to practice the invention. Exterior wall 20 is formed from a rectangular sheet of plastic screening 24 having two opposite sides of a length about equal to the circumference of top plate 16 and bottom plate 18. Plastic screening 24 includes a series of flow apertures 26. The housing 12 is constructed by rolling the plastic screening 24 into a tubular shape, securing the edges 28,30 to top plate 16 and bottom plate 18, and the edges 32,34 together in a manner to form a cylindrical shaped exterior wall 20. The edges 28,30,32 and 34 may be secured in any manner not affected by immersion in an aqueous liquid environment. In this preferred embodiment edges 38,30,32 and 34 are secured with a silicon adhesive.

Elongated feed tube 14 is constructed from about a sixty (60) centimeter length of polyvinylchloride (PVC) tubing having an external diameter about equal to the diameter of access aperture 22. Elongated feed tube 14 is attached to housing 12 by inserting connection end 36 into access aperture 22 and cementing it into place. It is preferred that connection end 36 extend about 2 centimeters through top plate 16 in order to aid construction of the second interior chamber which is discussed below. It is important that the length, "L", be selected to allow a section 38 of elongated feed tube 14 containing a feed opening 40 to extend past the liquid to air interface-surface of the collecting container.

Figure 2:
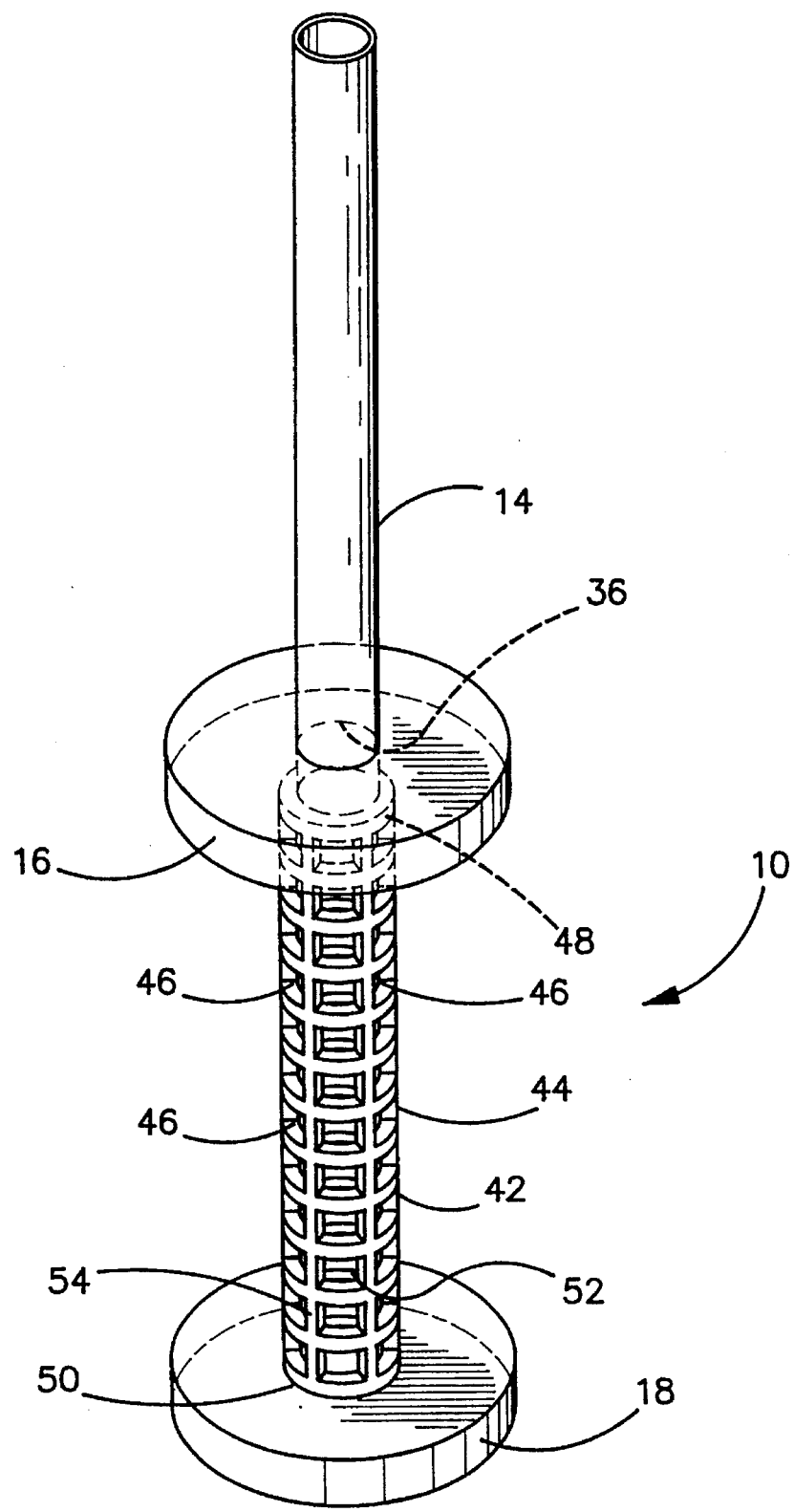
FIG. 2 is a perspective view of an embodiment of the bacterial incubator of the invention with the exterior wall removed.

FIG. 2 is a perspective view of the embodiment of the bacterial incubator 10 shown in FIG. 1 with exterior wall 20 removed. A common wall 42 is shown in connection with top plate 16 and bottom plate 18. Common wall 42 is also formed from a rectangular sheet of plastic screening 44 having two opposite sides of a length about equal to the circumference of access aperture 22. Plastic screening 44 includes a series of dispersal apertures 46. Plastic screening 44 is rolled into a tubular shape; edge 48 is secured to connecting end 36 of elongated feed tube 14; edge 50 is secured to bottom plate 18; and edges 52,54 are attached together in a manner to form a cylindrical shaped interior chamber (not shown in the figure) that is accessible through elongated feed tube 14.

Figure 4:
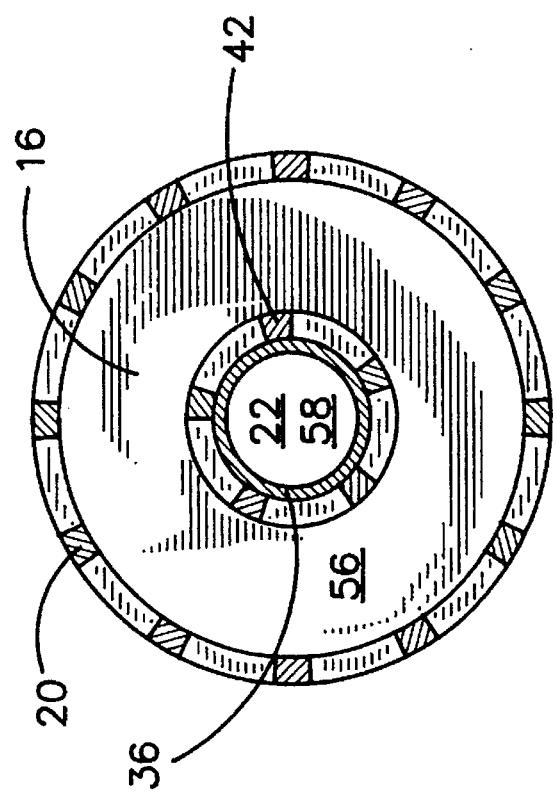
FIG. 4 is a cross-sectional view of an embodiment of the bacterial incubator of the invention shown in FIG. 1 along the line 4—4.
Figure 3:
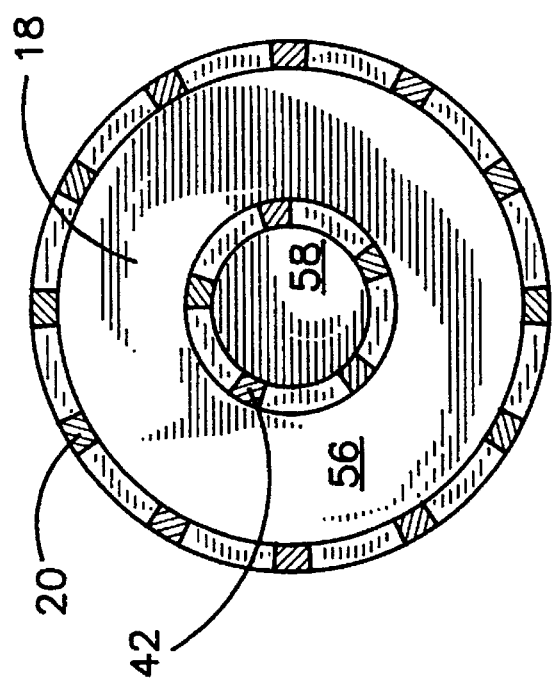
FIG. 3 is a cross-sectional view of an embodiment of the bacterial incubator of the invention shown in FIG. 1 along the line 3—3.

FIGS. 3 and 4 are cross-sectional top and bottom oriented views of the embodiment of the bacterial incubator 10 shown in FIG. 1 along the lines 3—3 and 4—4 respectively. FIG. 3 shows bottom plate 18, exterior wall 20, common wall 42 and a portion of a first interior chamber 56 and a second interior chamber 58. In a fully constructed embodiment first interior chamber 56 is filled with high surface-area members (shown in FIGS. 5A and 5B), these are not show in this Figure for the purpose of clarity.

FIG. 4 shows top plate 16, exterior wall 20, common wall 42, a portion of first interior chamber 56, a portion of second interior chamber 58, a portion of connecting end 36 and access aperture 22. As previously mentioned, the high surface area members have been omitted from first interior chamber 56 in this view for clarity purposes.

Figure 5B:
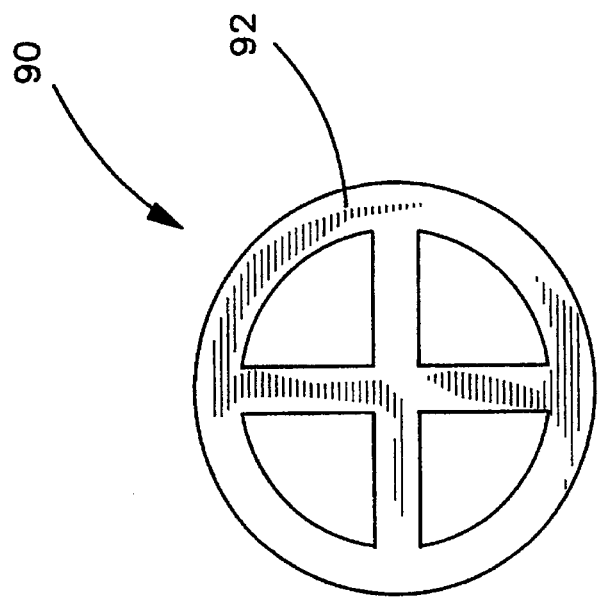
FIG. 5B is a frontal view of another preferred high surface-area member.
Figure 5A:
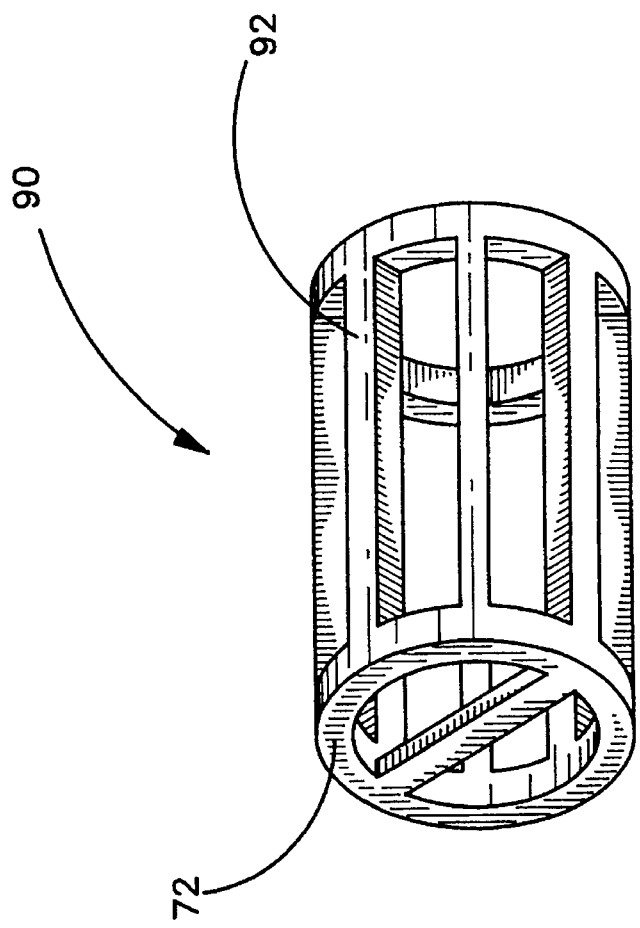
FIG. 5A is a perspective view of a preferred high surface-area member.

FIGS. 5A and 5B each show a preferred high surface-area member, generally indicated by the numeral 90. A quantity of the surface-area members 90 are positioned loosely within first interior chamber 56 during construction of housing 12. Each surface-area member 90 is constructed of an inert plastic and includes a plurality of surface area portions 92. Surface area portions 92 increase the surface area upon which bacteria may become attached and multiply, but allow liquid to freely circulate within first interior chamber 56. Although a variety of commercially available surface-area members may be used to practice the invention, such as cylinders, spheres or other shapes, it is preferred that the surface area to volume ratio of the surface-area members used exceed twenty (20) square meters per cubic meter of surface-area member volume.

Figure 6:
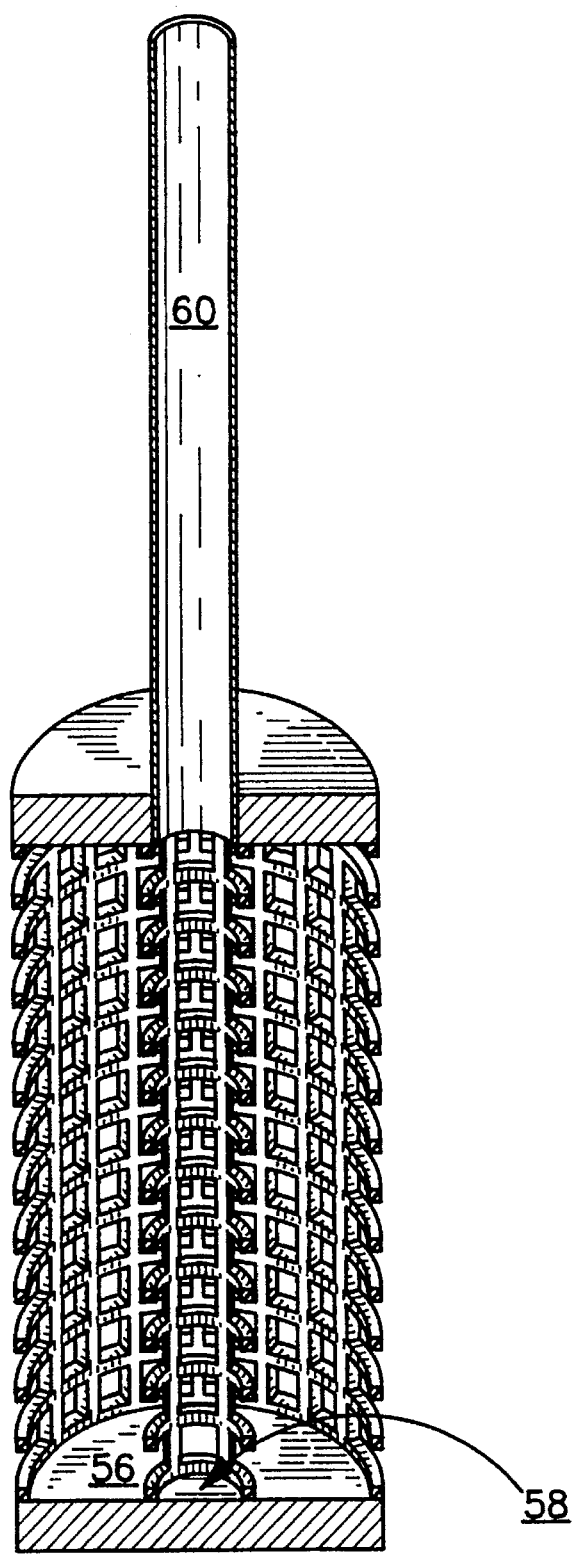
FIG. 6 is longitudinal cross-sectional view of the embodiment of the bacterial incubator of the invention shown in FIG. 1 along the line 6—6.

FIG. 6 is a longitudinal cross-sectional view of the embodiment of the bacterial incubator shown in FIG. 1 along the line 6—6. FIG. 6 shows a portion of first interior chamber 56, a portion of second interior chamber 58, and a feed passageway 60 in connection with second interior chamber 58. Once again, in a fully constructed embodiment first interior chamber 56 is filled with high surface-area members (shown in FIGS. 5A and 5B), these are not show in this figure for the purpose of clarity.

Figure 7:
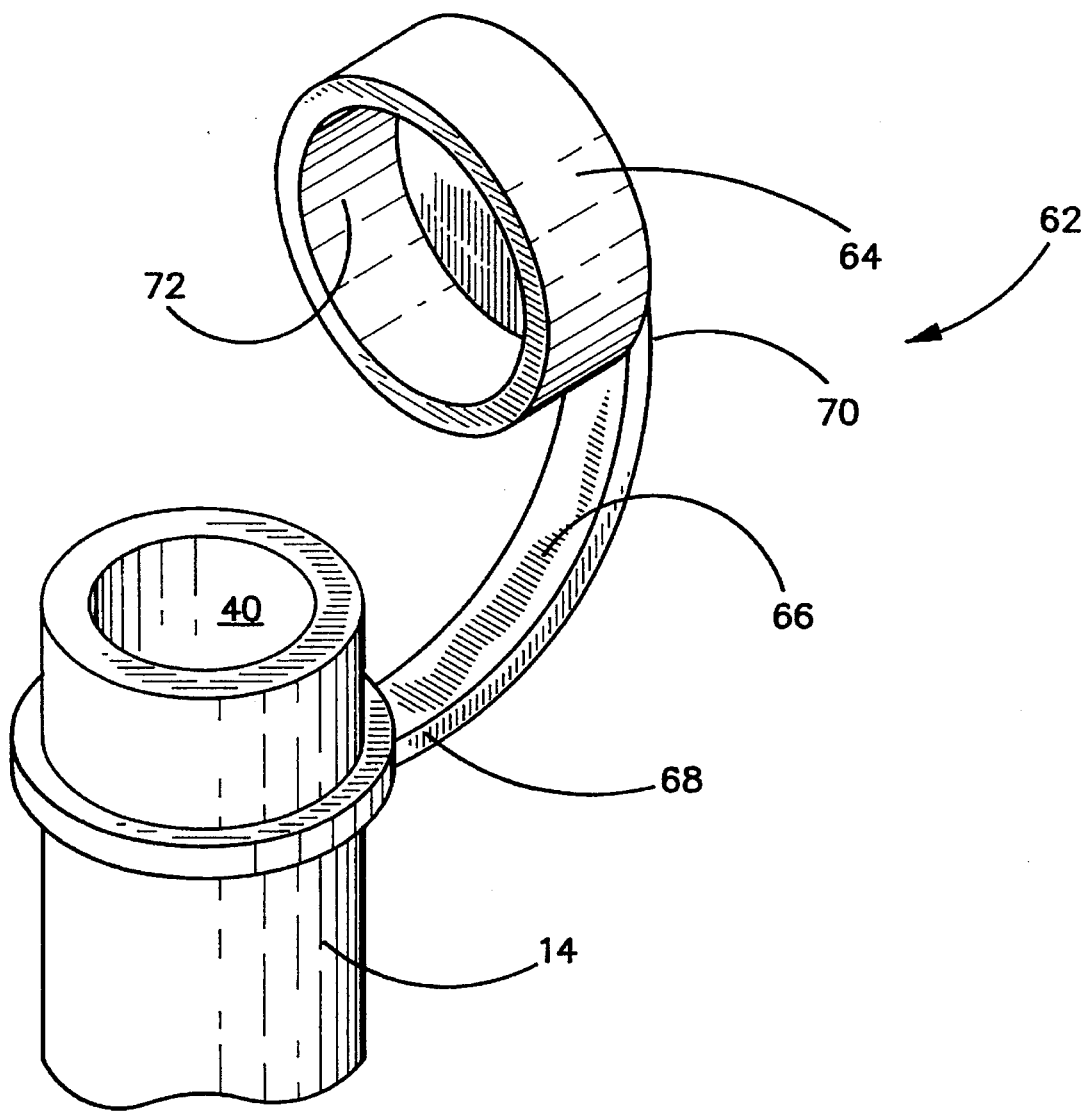
FIG. 7 is a partial perspective view of the elongated feed tube of an embodiment of the bacterial incubator of the invention illustrating a preferred capping means.

FIG. 7 shows an additional preferred feature that may be included in the incubator 10 of the present invention. This preferred feature is a capping member, generally indicated by the numeral 62. Capping member 62 includes a cap section 64 and an attachment section 66. Attachment section 66 is connected to elongated feed tube 14 at one end 68 and to cap section 64 at the other end 70. Cap section 64 has a sealing portion 72 adapted to be sealingly connectable with elongated feed tube 14 in a manner such that feed opening 40 is sealed when sealing portion 72 is in position over feed opening 40. This feature prevents the escape of gases, generated by the bacteria, through the feed passageway and causes the gases to be emitted through the high surface area members instead.

Figure 8:
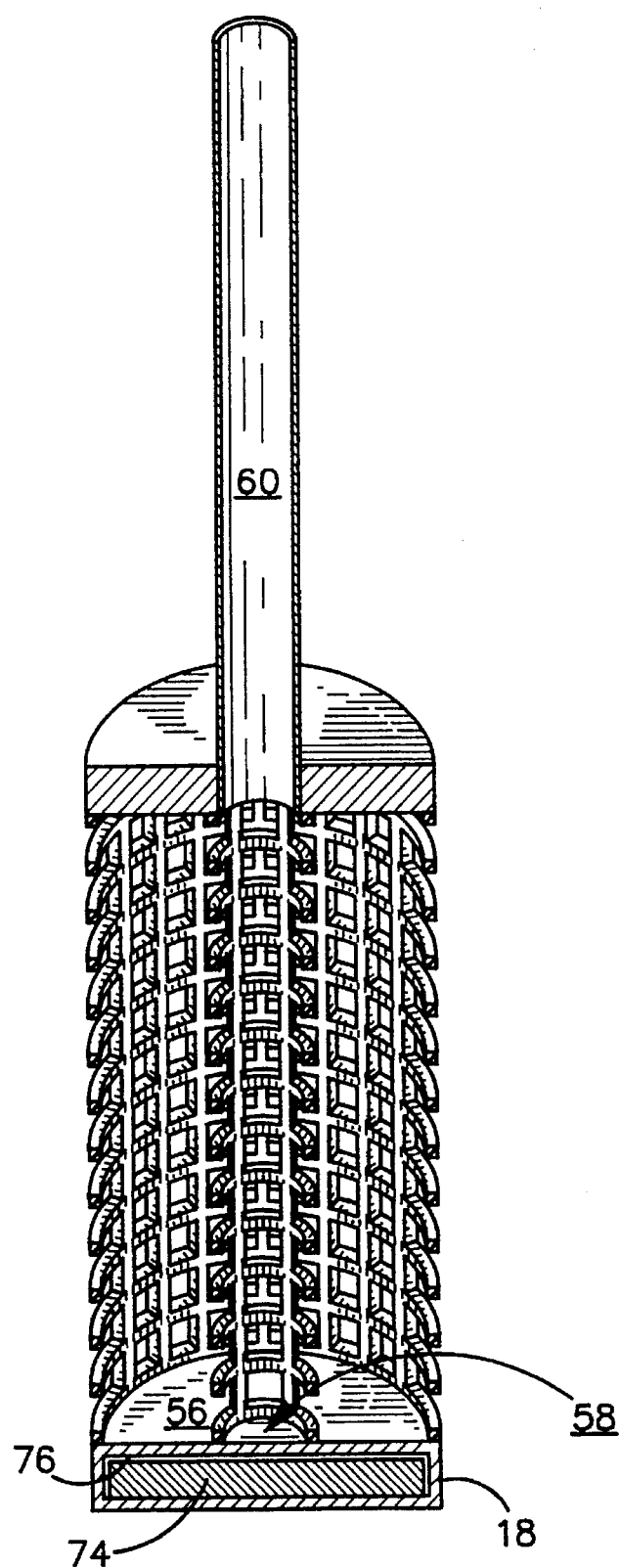
FIG. 8 is longitudinal cross-sectional view of a preferred embodiment of the bacterial incubator of the invention illustrating a preferred weight means.

FIG. 8 shows an additional preferred feature that may be included in the bacterial incubator 10 of the present invention. This preferred feature is a weight member 74 positioned within a weight member cavity 76 formed within bottom plate 18. Weight member 74 serves to lower the center of gravity of the incubator 10 and thereby stabilizes the upright positioning of incubator 10 when in use.

Figure 9:
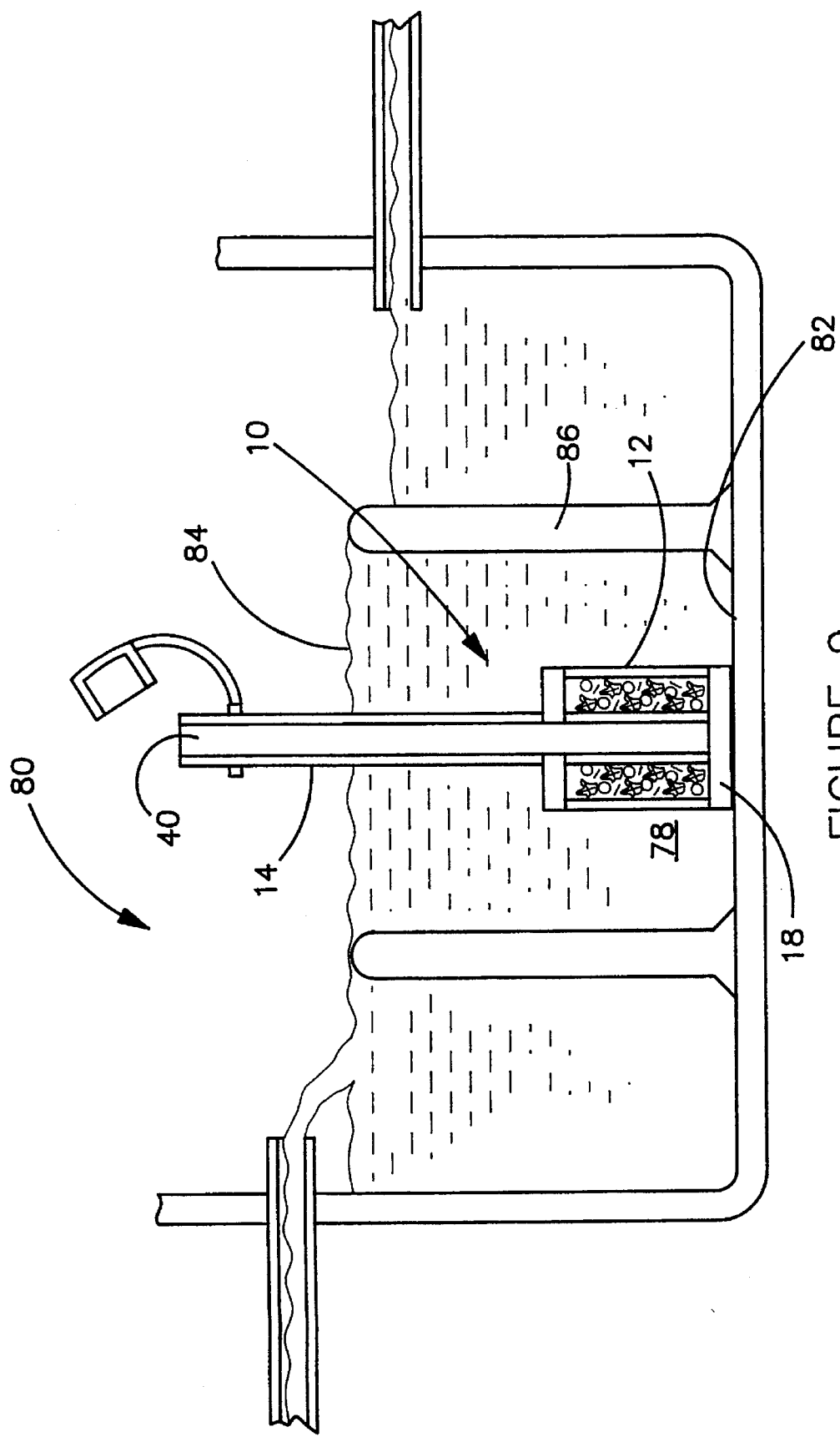
FIG. 9 is a cross-sectional view of an embodiment of the bacterial incubator of the invention in position within a typical collecting container of a representative organic matter collection system.

With reference to FIG. 9, in use, housing 12 is submerged beneath the liquid to air interface-surface of collecting container 78 and bacterial cultures are added to second internal chamber 58 via feed passageway 60. Once within second interior chamber 58, the bacteria contained within the bacterial cultures must pass through first interior chamber 56 before entering collecting container 78. This ensures the bacteria will have an opportunity to become attached to a high surface-area member 90 and produce a colony of additional bacteria. It is important to point out that most commercial bacterial cultures contain a variety of bacterial strains. The importance of growing additional bacteria within the particular collecting container 78 can not be overlooked. The growth of bacteria within a collecting container 78 is important because those bacteria for which the environment, within a particular collecting container 78, is best suited will reproduce at greater rates than those bacteria for which the environment is not as well suited. By "best suited" is meant, the collecting container has favorable temperature and dissolved gas conditions, and contains the type of organic waste that a particular strain of bacteria utilizes for food. Thus, those bacterial strains, contained within the commercial bacterial culture that will perform the best job of degrading the waste, will thrive and, therefore, be present within the collecting container in greater concentrations.

In terms of the type of bacteria that can be employed in the inventive device and method disclosed herein, some species that are acceptable would include *Bacillus subtilis, Bacillus thuringensis, Pseudomonas aeruginosa, Pseudomonas stutzeri, Pseudomonas putida,* and *Escherichia hermanii,* grown on a suitable carrier, such as bran. However, persons of ordinary skill in this field will understand that the specific bacteria used will depend highly on the type of organic waste, as well as environmental conditions, present within collecting container 78, and will not affect the manner in which the invention accomplishes its objectives.

DETAILED DESCRIPTION OF A PREFERRED METHOD OF MAINTAINING BACTERIAL LEVELS WITHIN THE COLLECTING CONTAINER OF AN ORGANIC MATTER COLLECTION SYSTEM

Although the following discussion will center around a preferred method of maintaining effective bacterial levels in a typical restaurant grease trap application, in no way should this be interpreted to limit the scope of the invention only to such applications. The discussion of a preferred method will be with reference to FIGS. 9, 10, 11 and 12.

FIG. 9 is a cross-sectional view of an embodiment of the bacterial incubator 10 positioned within a typical collecting container 78 of a representative organic matter collection system which is generally indicated by the numeral 80. The collecting container 78 includes a container bottom 82. In addition, when filled with wastewater and organic matter, there exists a liquid to air interface-surface 84. The maximum level at which interface-surface 84 exists is generally defined by the design of the particular collection system 80. In this example that level is determined by the height of second weir 86.

The method comprises the steps of providing a bacterial incubator 10 of the type previously described; positioning housing 12 beneath interface-surface 80 in a manner such that bottom plate 18 is supported by container bottom 82 and a section of elongated feed tube 14 containing feed opening 40 extends above interface-surface 80; and periodically adding bacterial cultures to second interior chamber 58 through feed passageway 60 via feed opening 40. The quantity and frequency of bacterial culture additions is dependent upon the volume of collecting container 78, the quantity of oils and grease disposed of into the waste water disposal system, and which commercially available bacterial cultures are used. Also, it is not required to position housing 12 at the bottom of collecting container 78 in order to practice the invention, it is only necesary to position the housing beneath the liquid-to-air interface surface 80.

Figure 10:
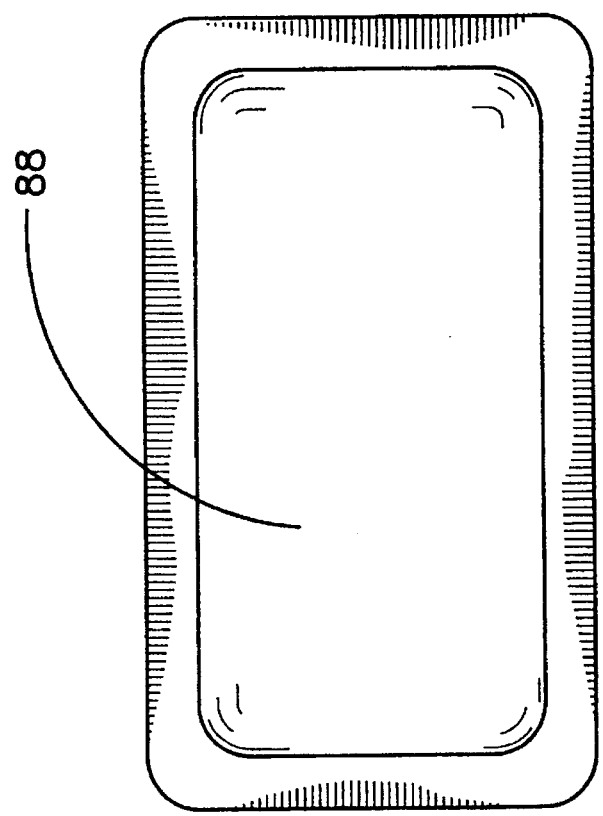
FIG. 10 is a top view of a preferred pre-measured bacterial culture packet.

In another preferred method, the bacterial cultures are packaged in pre-measured volumes within a water-soluble packet 88 or packets 88, such as shown in FIG. 10. The external dimensions of water-soluble packet 88 are selected to allow the water-soluble packet 88 to slide unimpeded through feed passageway 60 into the second internal chamber 58. The packet in this preferred embodiment is constructed from polyvinylalcohol and contains about three ounces of bacterial cultures.

Figure 11:
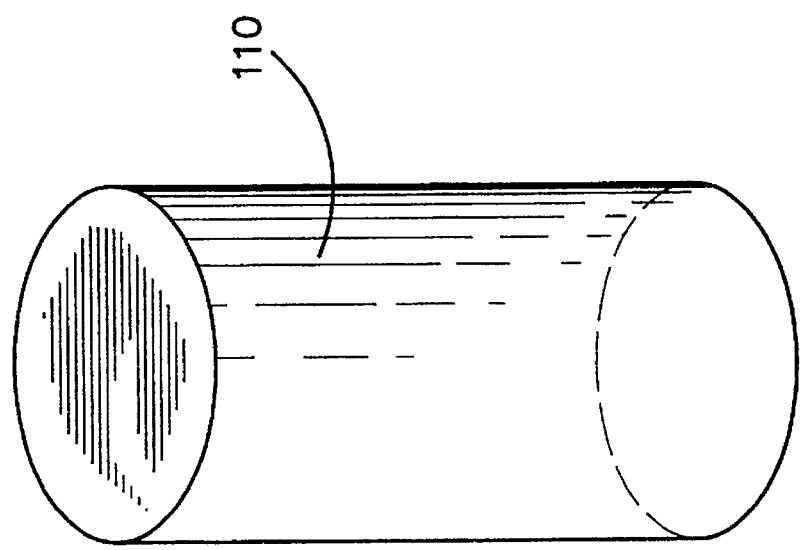
FIG. 11 is a perspective view of a preferred solid cake.

In another preferred embodiment the bacterial cultures added are in the form of a solid cake 110 or cakes 110, shown in FIG. 11. It is preferred that solid cake 110 comprise a mixture of plaster-of-paris, bacterial cultures and micronutrients. However, any binder which will dissolve gradually in water and release the bacterial cultures over a period of time may be substituted for the plaster-of-paris. The preferred solid cakes 110 are constructed by adding water to the plaster-of-paris to form a slurry, mixing in the bacterial cultures and micronutrients to form a mixture, pouring the combined mixture into a mould having the desired shape, and allowing the combined mixture to harden within the mould at least until it becomes hard enough to handle. The advantage of using solid cakes 110 is that, once placed inside second interior chamber 58 and exposed to the liquid within collecting container 78, solid cakes 110 gradually dissolve over an approximately 30 day period. As solid cake 110 dissolves, it continuously releases bacterial cultures into first interior chamber 56 which contains the high surface-area members 90. This continuous release of bacterial cultures into first interior chamber 56 provides easy, cost effective reseeding of the high surface-area members.

Figure 12:
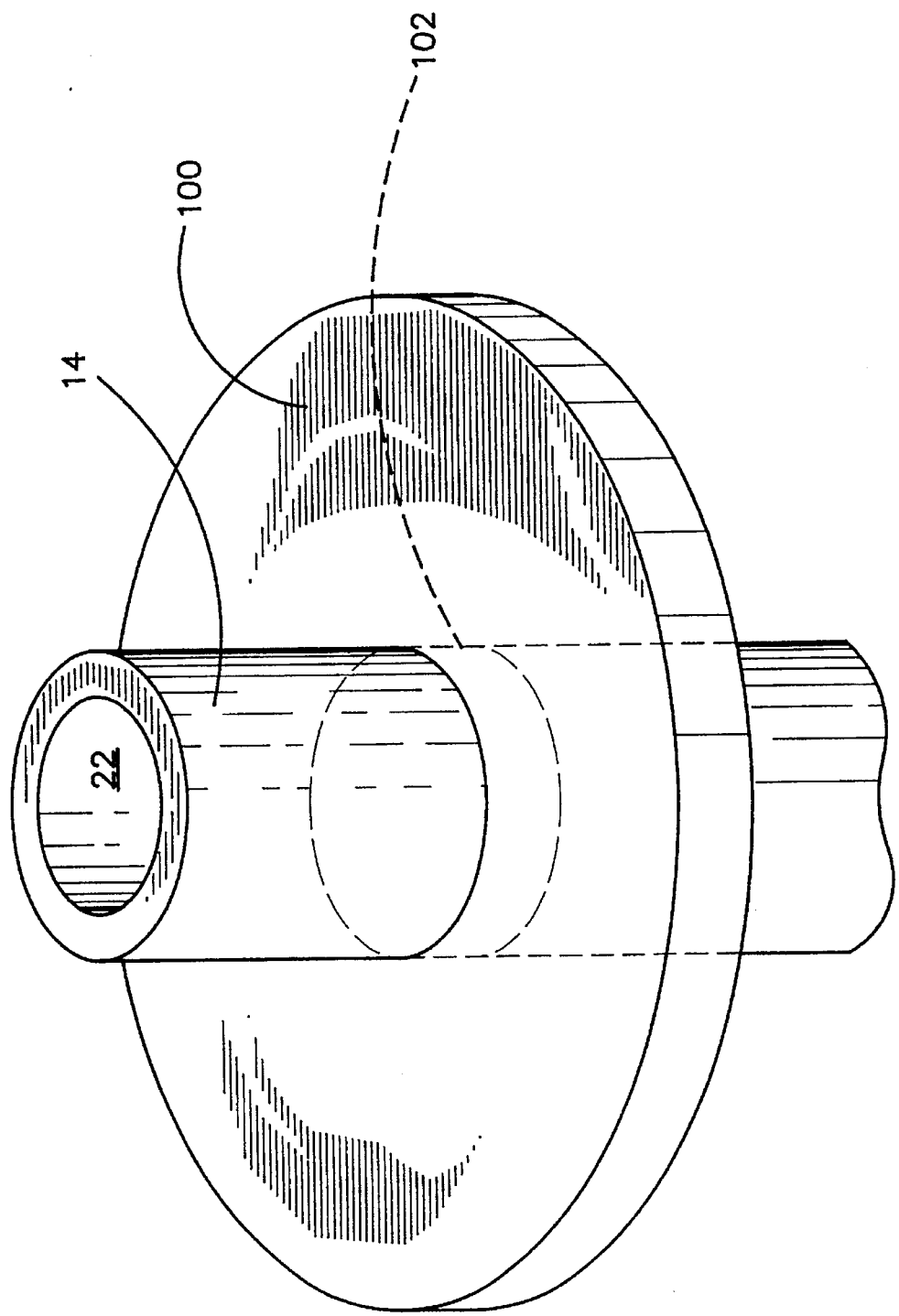
FIG. 12 is a perspective view of a container cover having an aperture.

Another preferred method is now described with reference to FIGS. 9 and 12. In this preferred method, in addition to the steps previously discussed, there are two additional steps. The first step includes providing a cover 100 for collecting container 78. Cover 100 includes a cover aperture 102 having sufficient dimensions to allow a section of said elongated feed tube 14 containing said second passageway opening 22 to pass through cover 100. The second step includes positioning cover 100 over collecting container 78 in a manner such that a section of elongated feed tube 14 containing second passageway opening 22 passes through cover 100.

Upon review of the disclosure contained herein it should be apparent that the bacterial incubator and method of the present invention provides an easily taught, inexpensive, and unobjectionable solution to maintaining effective bacterial levels within the collecting container of an organic waste collection system that does not require prior preparation of bacterial cultures. Other embodiments of the invention may occur to those skilled in the art, and such embodiments are intended to be included within the scope and spirit of the following claims.

What is claimed is:

1. A bacterial incubator for use in an organic matter collection system comprising a collecting container having a bottom and a liquid to air interface-surface, said bacterial incubator comprising:

a) a housing having an exterior surface, a first interior chamber and a second interior chamber, said first and second interior chambers being separated by a common wall, said first interior chamber being partially defined by a first wall having a plurality of first apertures therethrough connecting said first interior chamber with said exterior surface of said housing, said common wall separating said first and second interior chambers having a plurality of second apertures therethrough connecting said second interior chamber with said first interior chamber said housing being positioned in said collecting container so as to be below said liquid to air interface-surface;

b) an elongated feed tube having a passageway therethrough that terminates in first and second passageway openings, said first passageway opening being in connection with said second interior chamber of said housing, said elongated feed tube being of a length sufficient to allow a section thereof containing said second passageway opening to extend above said liquid to air interface-surface; and c) a plurality of high surface area members contained within said first interior chamber, said high surface area members having exterior dimensions sufficient to prevent said high surface area members from passing through said first and second apertures.

2. The bacterial incubator of claim 1, wherein said bacterial incubator is constructed of materials having a mass sufficient to cause said housing to sink to said bottom of said collecting container and remain on said bottom when in use.

3. The bacterial incubator of claim 1, further including a weight means, connected to said housing at a location near a bottom portion of the housing, for lowering the center of gravity of the housing containing the plurality of high surface area members, said location and the weight of said weight means adapted such that said housing will remain stable in an upright position.

4. The bacterial incubator of claim 1, further including a cap means, detachably securable to said elongated feed tube in a manner such that said second passageway opening is sealed, for preventing the escape of gases through said second passageway opening.

5. The bacterial incubator of claim 1, wherein the shape of said first interior chamber is tubular and the shape of said second interior chamber is cylindrical.

6. The bacterial incubator of claim 5, wherein said elongated feed tube passes through said exterior surface directly into said second interior chamber.

7. The bacterial incubator of claim 1, wherein said elongated feed tube has sufficient rigidity to allow said section of said elongated feed tube containing said second passageway opening to remain above the air to liquid interface-surface supported only by the connection of said elongated feed tube with said second interior chamber.

8. The bacterial incubator of claim 1, wherein the total void area of said plurality of second apertures is less than the total void area of said plurality of first apertures.

9. A method of maintaining effective bacterial levels within an organic matter collection system, said system comprising a collecting container having a bottom and a liquid to air interface-surface, said method comprising the steps of:

a) providing a bacterial incubator comprising:

i) a housing having an exterior surface, a first interior chamber and a second interior chamber, said first and second interior chambers being separated by a common wall, said first interior chamber being partially defined by a first wall having a plurality of first apertures therethrough connecting said first interior chamber with said exterior surface of said housing, said common wall separating said first and second interior chambers having a plurality of second apertures therethrough connecting said second interior chamber with said first interior chamber said housing being positioned in said collecting container so as to be below said liquid to air interface-surface;

ii) an elongated feed tube having a passageway therethrough that terminates in first and second passageway openings, said first passageway opening being in connection with said second interior chamber of said housing, said elongated feed tube being of a length sufficient to allow a section thereof containing said second passageway opening to extend above said liquid to air interface-surface; and iii) a plurality of high surface area members contained within said first interior chamber, said high surface area members having exterior dimensions sufficient to prevent said high surface area members from passing through said first and second apertures b) positioning said housing in said collecting container so that said housing is below said liquid to air interface-surface and so that a section of said elongated feed tube containing said second passageway opening extends above said liquid to air interface-surface; and c) periodically adding bacterial cultures to said second interior chamber through said passageway of said elongated feed tube via said second passageway opening in amounts effective to degrade organic matter in said organic matter collection system.

10. The method of claim 9, further including the step of providing a water-soluble container, containing said bacterial cultures, having external dimensions which allow said water-soluble container to slide through said passageway into said second internal chamber; and wherein the bacterial cultures added to said second interior chamber are contained within said water-soluble container.

11. The method of claim 10, further including the steps of:

d) providing a cover for the collecting container having a cover aperture of sufficient dimensions to allow the section of said elongated feed tube containing said second passageway opening to pass through said cover; and e) positioning said cover over said collecting container in a manner such that the section of said elongated feed tube containing said second passageway opening passes through said cover.

12. The method of claim 9, further including the step of providing a solid cake comprising a binding agent and said bacterial cultures, said solid cake having external dimensions which allow said solid cake to slide through said passageway into said second internal chamber; and wherein said bacterial cultures added to said second interior chamber are in the form of said solid cake.

13. The method of claim 12, wherein said binding agent includes gypsum.

14. The method of claim 12, further including the steps of:

d) providing a cover for the collecting container having an cover aperture of sufficient dimensions to allow the section of said elongated feed tube containing said second passageway opening to pass through said cover; and e) positioning said cover over said collecting container in a manner such that the section of said elongated feed tube containing said second passageway opening passes through said cover.

15. The method of claim 12, wherein said bacterial incubator further includes a cap means, detachably securable to said elongated feed tube in a manner such that said second passageway opening is sealed, for preventing the escape of gases through said second passageway opening.

16. The method of claim 9, wherein said bacterial incubator further includes a weight means, connected to said housing at a location near a bottom portion of the housing, for lowering the center of gravity of the housing containing the plurality of high surface area members said location and the weight of said weight means adapted such that said housing will remain stable in an upright position.

17. The method of claim 16, further including the steps of:

d) providing a cover for the collecting container having an cover aperture of sufficient dimensions to allow the section of said elongated feed tube containing said second passageway opening to pass through said cover; and e) positioning said cover over said collecting container in a manner such that the section of said elongated feed tube containing said second passageway opening passes through said cover.

18. The method of claim 9, wherein said bacterial incubator further includes a cap means, detachably securable to said elongated feed tube in a manner such that said second passageway opening is sealed, for preventing the escape of gases through said second passageway opening.

19. The method of claim 9, wherein said elongated feed tube has sufficient rigidity to allow said section of said elongated feed tube containing said second passageway opening to remain above the air to liquid interface-surface supported only by the connection of said elongated feed tube with said second interior chamber.

20. The method of claim 9, further including the steps of:

d) providing a cover for the collecting container having a cover aperture of sufficient dimensions to allow the section of said elongated feed tube containing said second passageway opening to pass through said cover; and e) positioning said cover over said collecting container in a manner such that the section of said elongated feed tube containing said second passageway opening passes through said cover.

21. A bacterial incubator for use in an organic matter collection system comprising a collecting container having a bottom and a liquid to air interface-surface, said bacterial incubator comprising:

a) a housing having an exterior surface, a first interior chamber and a second interior chamber, said first and second interior chambers being separated by a common wall, said first interior chamber being partially defined by a first wall having a plurality of first apertures therethrough connecting said first interior chamber with said exterior surface of said housing, said common wall separating said first and second interior chambers having a plurality of second apertures therethrough connecting said second interior chamber with said first interior chamber of said housing;

b) an elongated feed tube having a passageway therethrough that terminates in first and second passageway openings, said first passageway opening being in connection with said second interior chamber of said housing, said elongated feed tube being of a length sufficient to allow a section thereof containing said second passageway opening to extend above said liquid to air interface-surface, said elongated feed tube having sufficient rigidity to allow said section of said elongated feed tube containing said second passageway opening to remain above the air to liquid interface-surface supported only by the connection of said elongated feed tube with said second interior chamber;

c) a plurality of high surface area members contained within said first interior chamber, said high surface area members having exterior dimensions sufficient to prevent said high surface area members from passing through said first and second apertures;

d) weight means, connected to the housing at a location near a bottom portion of the housing, for lowering the center of gravity of the housing containing said plurality of high surface-area members; said housing containing said high surface area members and including said weight means; said weight means having a mass to displacement ratio sufficient to cause said housing to rest on the bottom of said collecting container to be positioned below said liquid to air interface of said collecting container, and to remain there unanchored when in use.

* * * * *